Figure 1:
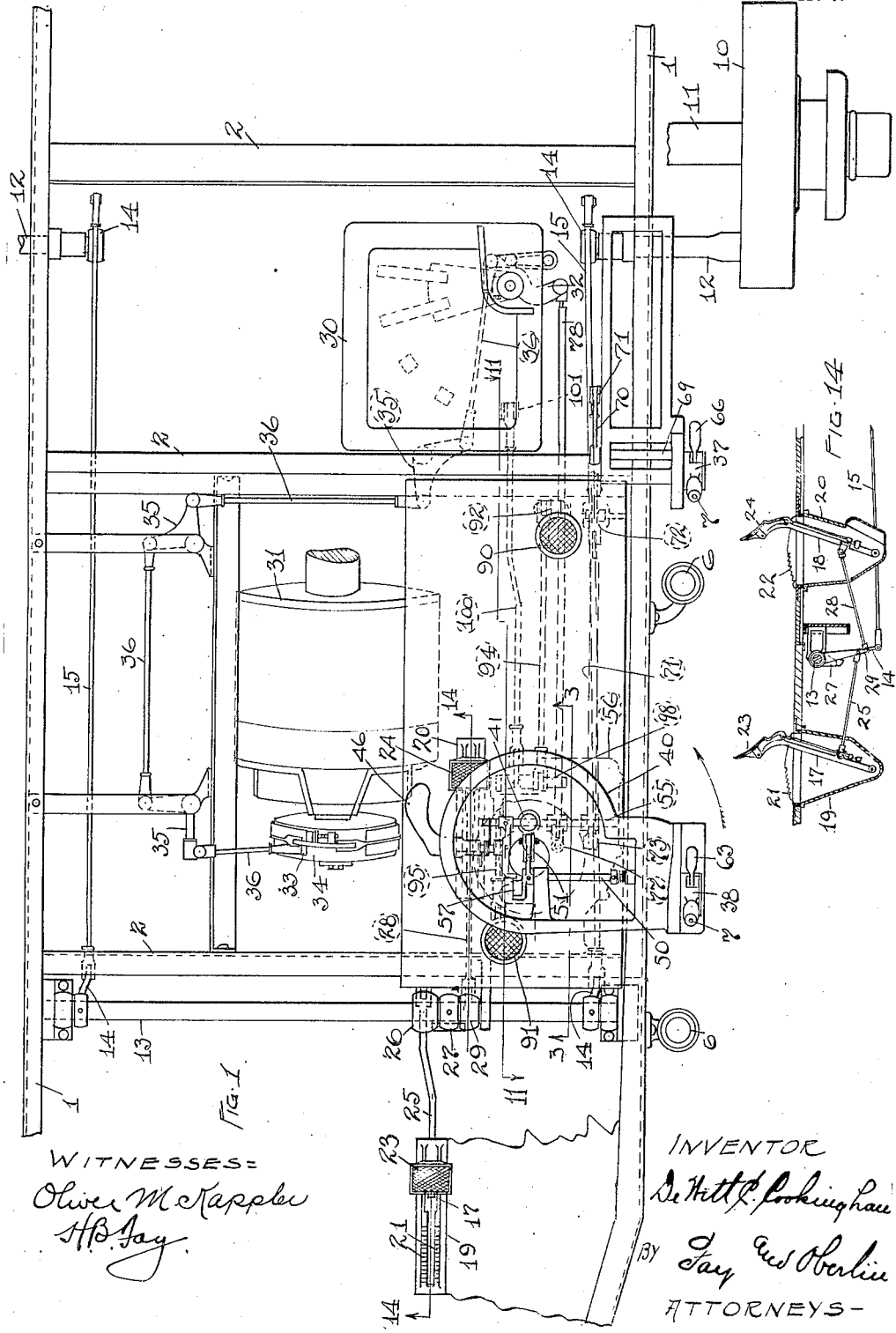

DE WITT C COOKINGHAM.
CONTROLLING MECHANISM FOR MOTOR VEHICLES.
APPLICATION FILED APR. 9, 1914.

1,359,577.

Patented Nov. 23, 1920.
6 SHEETS—SHEET 1.

DE WITT C COOKINGHAM.
CONTROLLING MECHANISM FOR MOTOR VEHICLES.
APPLICATION FILED APR. 9, 1914.

1,359,577. Patented Nov. 23, 1920.
6 SHEETS—SHEET 2.

WITNESSES:
Oliver M. Kappler
H. B. Fay

INVENTOR
De Witt C. Cookingham
BY Fay and Oberlin
ATTORNEYS

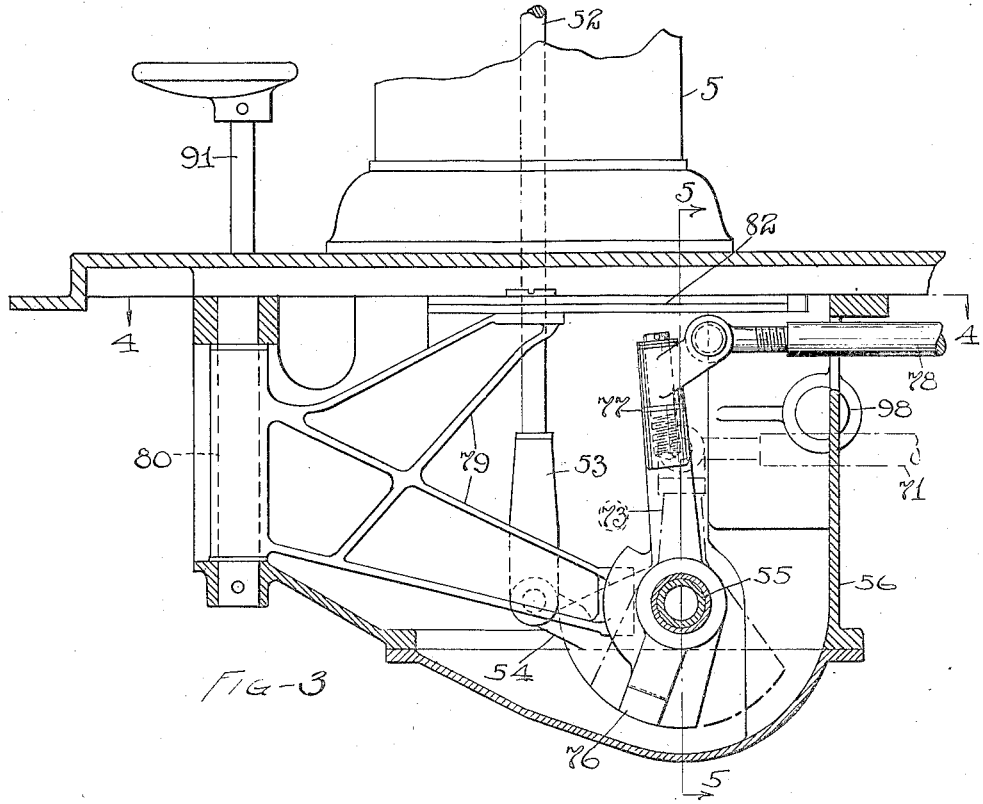
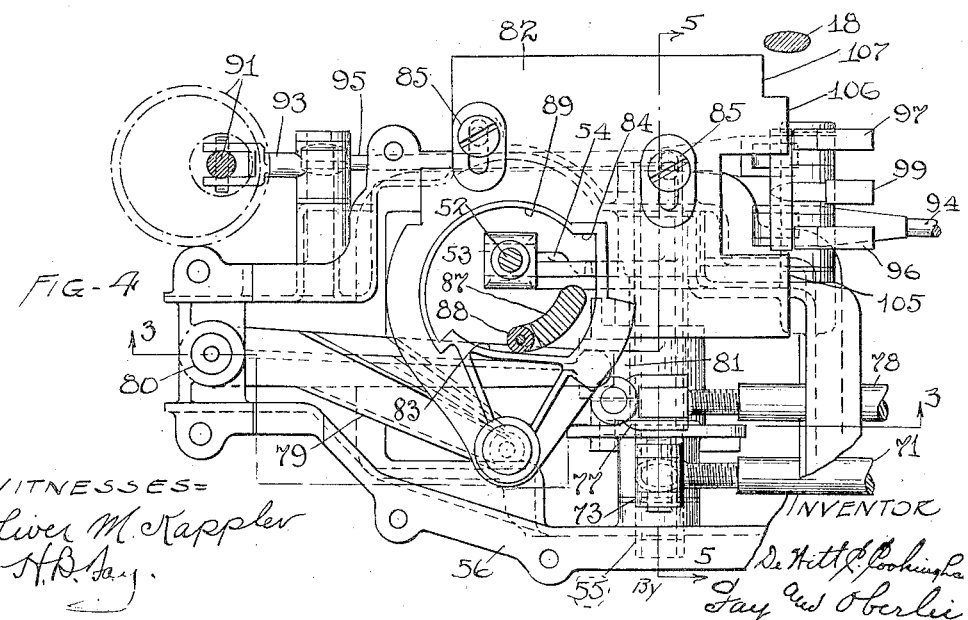

DE WITT C COOKINGHAM.
CONTROLLING MECHANISM FOR MOTOR VEHICLES.
APPLICATION FILED APR. 9, 1914.
1,359,577.
Patented Nov. 23, 1920.
6 SHEETS—SHEET 4.
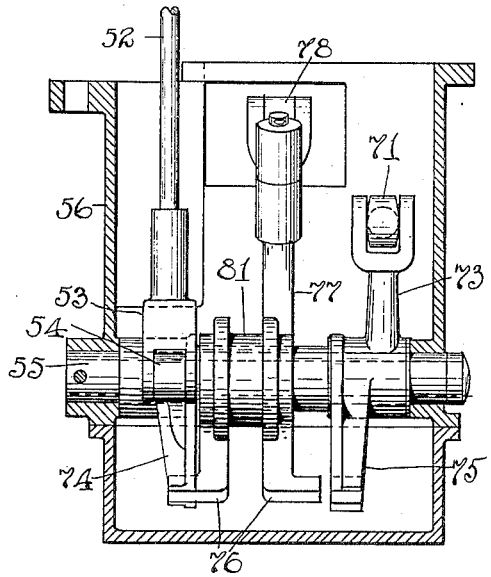
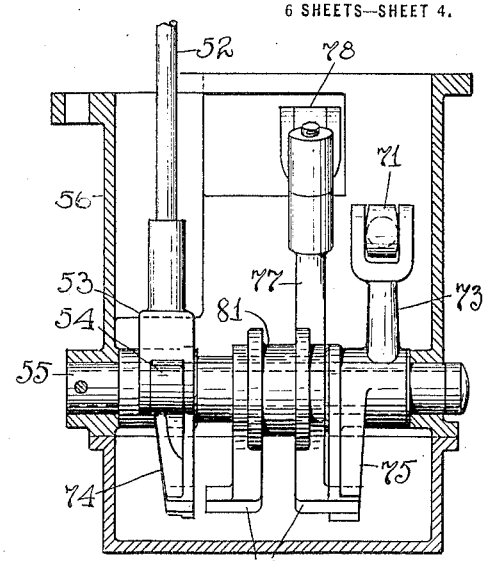
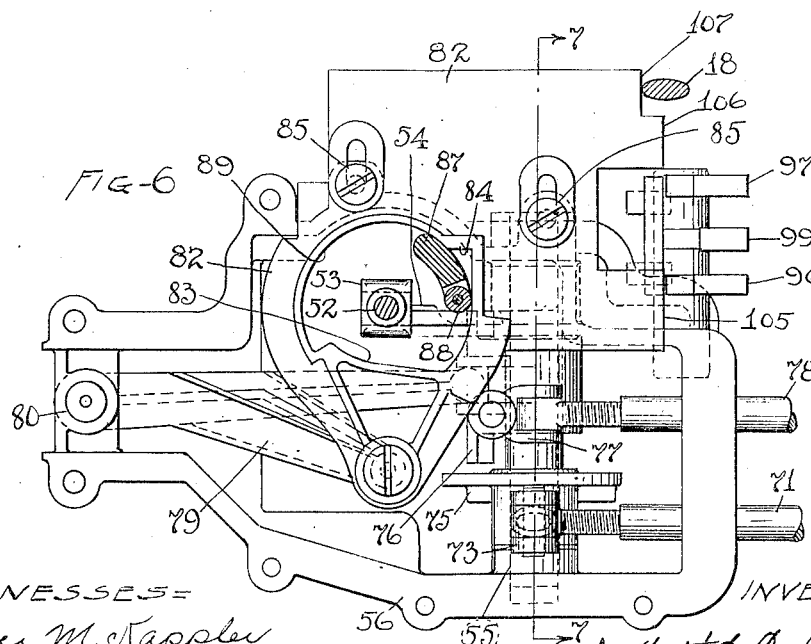

DE WITT C COOKINGHAM.
CONTROLLING MECHANISM FOR MOTOR VEHICLES.
APPLICATION FILED APR. 9, 1914.
1,359,577.
Patented Nov. 23, 1920.
6 SHEETS—SHEET 5.
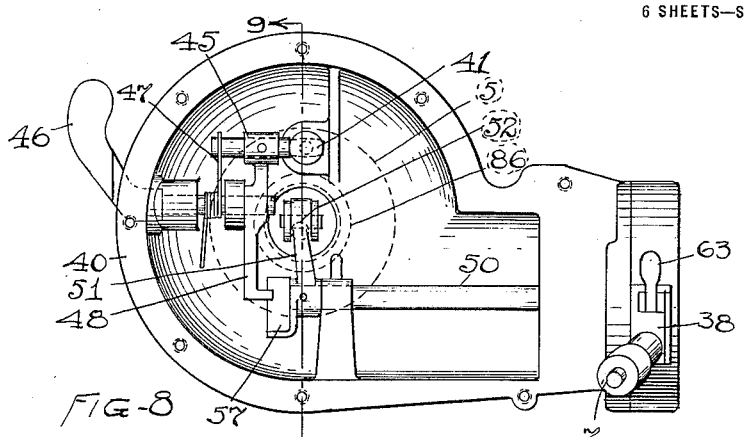
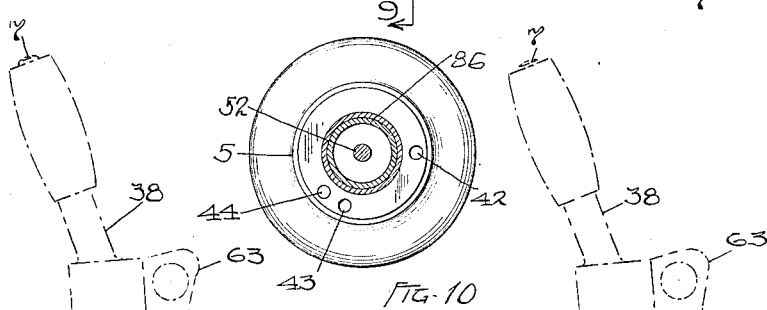
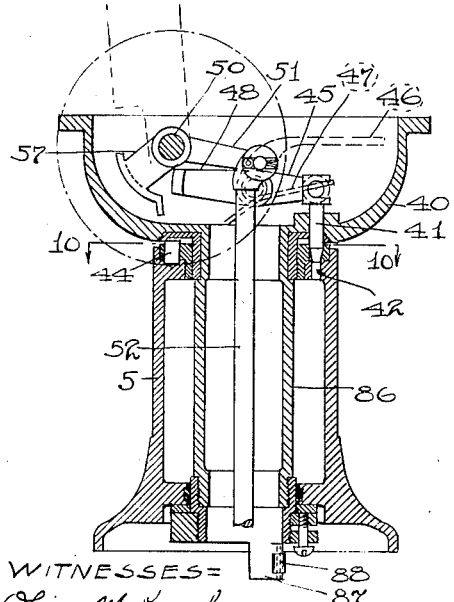
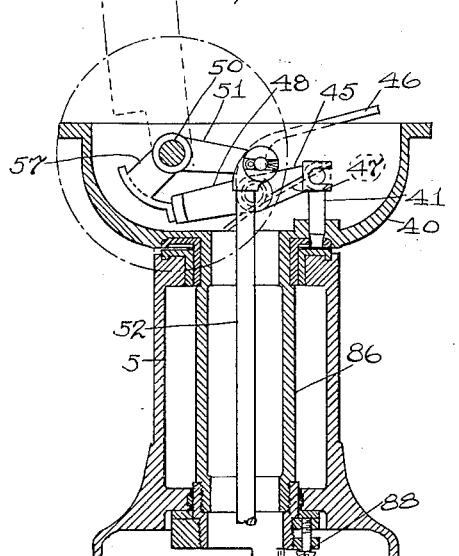

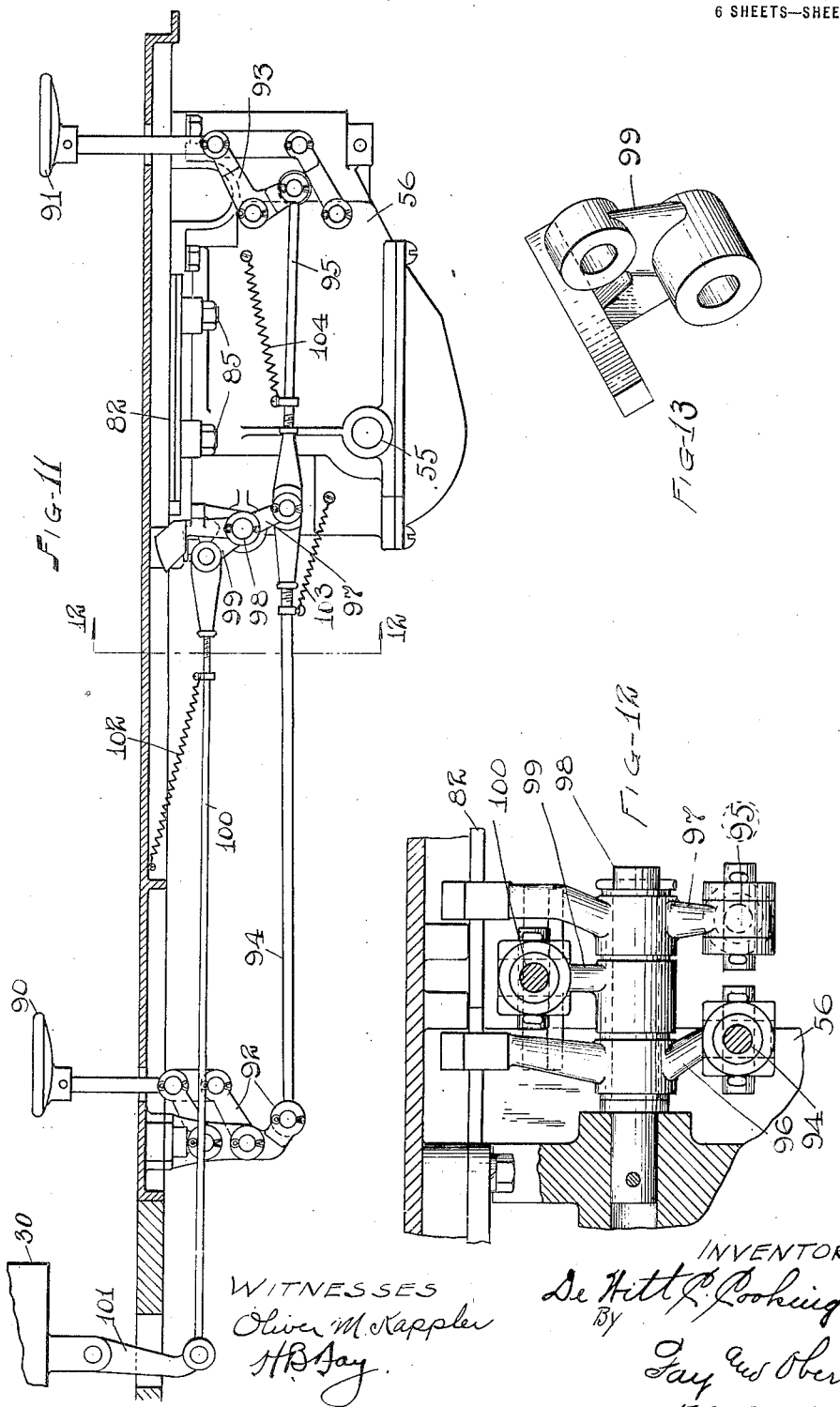

UNITED STATES PATENT OFFICE.

DE WITT C. COOKINGHAM, OF LAKEWOOD, OHIO, ASSIGNOR TO THE BAKER R. & L. COMPANY, OF CLEVELAND, OHIO, A CORPORATION OF OHIO.

CONTROLLING MECHANISM FOR MOTOR-VEHICLES.

1,359,577.	Specification of Letters Patent.	Patented Nov. 23, 1920.

Application filed April 9, 1914. Serial No. 830,780.

*To all whom it may concern:*

Be it known that I, DE WITT C. COOKINGHAM, a citizen of the United States, and a resident of Lakewood, county of Cuyahoga, and State of Ohio, have invented a new and useful Improvement in Controlling Mechanism for Motor-Vehicles, of which the following is a specification, the principle of the invention being herein explained and the best mode in which I have contemplated applying that principle, so as to distinguish it from other inventions.

The present improvements, relating as indicated to controlling mechanism for electric vehicles, have particular regard to the provision of dual control means whereby such a vehicle may be operated from either one of a plurality of stations on the vehicle, as for example, from either one of two seats which may thus be optionally occupied by the driver. Said improvements further comprehend the provision of means whereby, when the vehicle is being operated from one such station or seat, its operation by a person in the other section or seat is absolutely prevented, thus avoiding the possibility of interference on the part of a passenger. The present improvements are designed more especially for use on electric automobiles, in which it has become desirable, with the increasing size of the vehicle and the provision of forward seats in addition to the usual main seat, to provide a steering column, controlling lever, brake pedal and the like in connection not only with such rear or main seat, but also with one of the forward seats so that when all of the seats are in use the driver may occupy such forward seat and not have his vision obscured by a passenger in front of him. Obviously, where the driver thus moves into a forward seat, the various controlling devices associated with the rear seat are desirably rendered inoperative so that the driver is assured against any interference, accidental or otherwise, on the part of an occupant of such rear seat. While the invention is thus peculiarly adapted for use in the connection just described, it is not meant to imply by the foregoing that such is its only field of use, since there are various other situations in which controlling mechanisms of this sort may be advantageously utilized. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
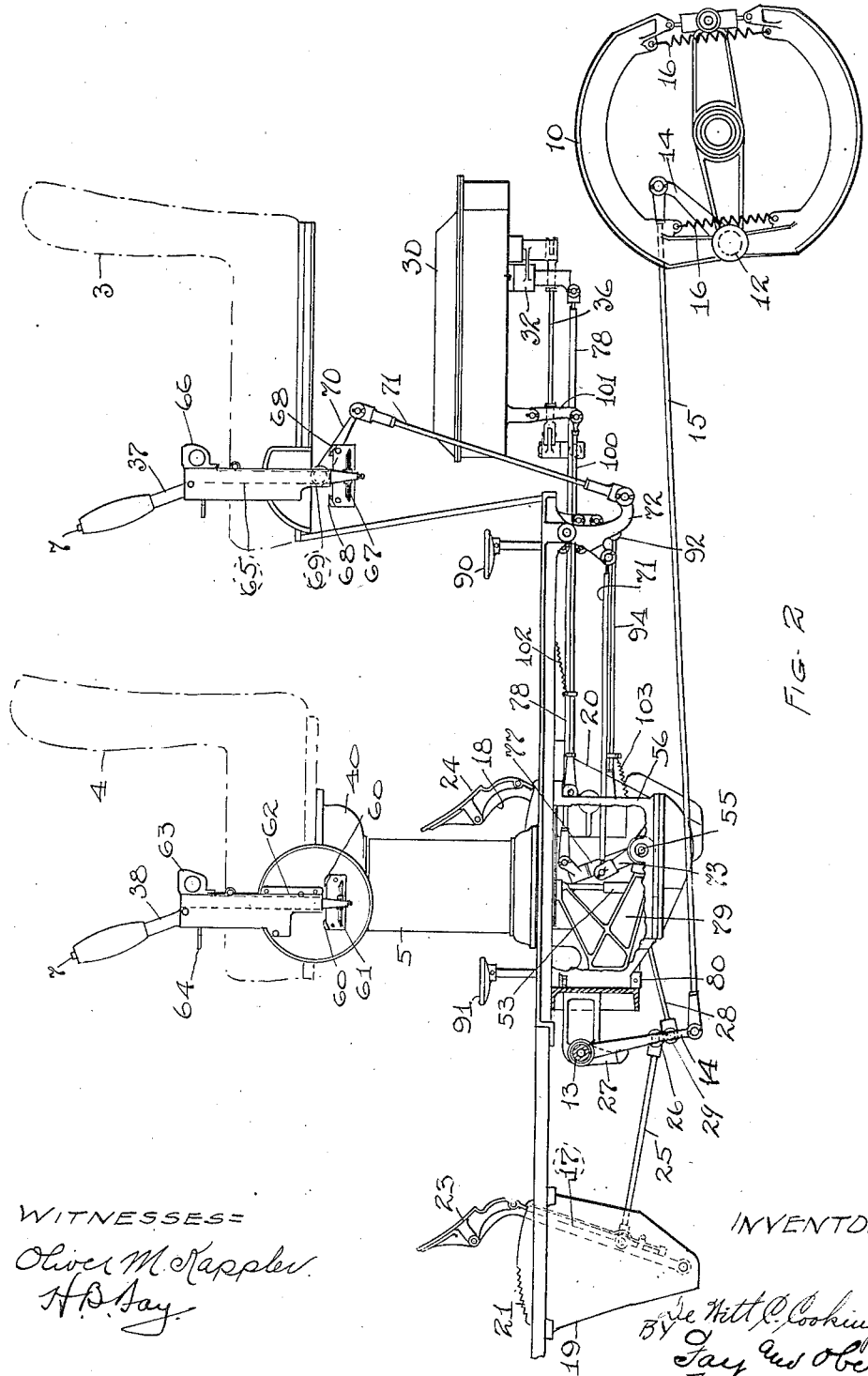

Figure 1 is a broken plan view of the chassis of an electric motor vehicle, parts being broken away to show the driving and controlling mechanism; Fig. 2 is a side elevational view of the same; Fig. 3 is a vertical sectional view taken on the plane indicated on the line 3—3, Fig. 1; Fig. 4 is a horizontal sectional view taken on the plane indicated by the line 4—4, Fig. 3; Fig. 5 is a vertical sectional view taken at right angles to that in Fig. 3, as indicated by the lines 5—5 in said figure and in Fig. 4; Fig. 6 is a view similar to Fig. 4, but showing a different operative position of the parts; Fig. 7 is a sectional view similar to Fig. 5, but showing the position of the parts as in Fig. 6, the plane of the section being indicated by the line 7—7 in said Fig. 6; Fig. 8 is an enlarged plan view of the forward seat of the vehicle with attached parts; Fig. 9 is a vertical central section of such seat, the plane of the section being indicated by the line 9—9, Fig. 8; Fig. 9ª is a section similar to Fig. 9, but showing a different operative position of the parts; Fig. 10 is a horizontal section on the line 10—10, Fig. 9; Fig. 11 is a vertical longitudinal section taken on the line 11—11, Fig. 1; Fig. 12 is a vertical transverse section of the same parts that appear in Fig. 11, the plane of the section being indicated by the line 12—12 in said figure; Fig. 13 is a perspective view of one of the elements or parts shown in Figs. 11 and 12; and Fig. 14 is a sectional view taken on the line 14—14, Fig. 1.

As previously indicated, the particular vehicle in connection with which my improved controlling mechanism is illustrated in the foregoing figures is an electric automobile. Of the vehicle proper only certain portions of the frame, viz., the side members 1 and several of the cross members 2, are shown. The location and typical form of the rear seat 3 and the extra forward seat 4 are shown in dotted outline in Fig. 2, it being understood that such rear seat is fixed as usual in vehicles in this class, while the forward seat is preferably swiveled, as by being rotatably mounted on a pedestal 5, so that it may be turned about, that is, into the corresponding front corner of the vehicle, when not in use or when it is occupied by a passenger, although it is not contemplated that this seat will be used by a passenger but rather by the driver, if it is in use at all. The rear seat will ordinarily extend entirely across the width of the vehicle while in addition to the seat 4, a second forward seat (not illustrated) will ordinarily be provided, which will be mounted on a pedestal similar to such illustrated forward seat, but without having any controlling mechanism associated therewith.

The controlling mechanisms usually provided in such a vehicle for operation by the driver comprise, in addition to the steering mechanism and alarm (bell or the like), wheel-braking mechanism, motor controller mechanism (whereby the current may be thrown on or off and varied in amount), motor braking mechanism, and motor reversing mechanism. In the illustrated construction the steering columns (not shown) are journaled in vertical bearings 6 attached to one side member of the frame so as to be disposed alongside and a trifle forward of the respective seats 3 and 4, which may be optionally occupied by the driver. The alarm mechanism, where the latter comprises a bell or electric horn, is actuated by simply closing an electric circuit, likewise not shown, although the push buttons 7 for effecting such closure are shown as conveniently mounted in the end of the handles on the respective controller levers, which will be described later. The several mechanisms for which a selective dual control is provided will now be described in the order in which they are referred to above.

The wheel brakes 10 shown are of the expanding type, only one being illustrated in Figs. 1 and 2, viz., that at the left end of the driving axle 11. Such brakes are operated by partially rotating shafts 12, disposed one adjacent to each wheel. These shafts in turn are connected with a transverse rock-shaft 13 near the forward end of the frame by means of levers 14 on the respective shafts and suitable connecting rods 15, which join such levers, as will be readily understood.

It will also be understood that springs 16, either associated with the brakes themselves, as shown in Fig. 2, or with one or the other of the shafts or connecting parts just described, will normally retain such brakes inoperative. To throw on the brakes or, in the specific construction illustrated, to expand the same against the action of such springs, two foot-levers 17 and 18 are provided, the last-named in front of the rear or fixed seat 3 and the other in front of the forward rotatably mounted seat 4. These levers are respectively pivotally supported at their lower ends in quadrant casings 19 and 20 formed with notches 21 and 22, wherewith oscillatory plates or pedals 23 and 24 on the upper ends of the levers may engage when the levers are shoved forwardly, thus retaining said levers in such forward position with the brakes applied, (Fig. 14).

The forward lever 17 is connected to oscillate the rock shaft 13 by means of a rod 25 attached at one end to said lever and at the other end to a lever 26 loosely mounted on said shaft, but arranged to engage a cross arm on a second lever 27 fixedly mounted on said shaft. Similarly, the rear lever 18 is connected by means of another rod 28 with a third lever 29 disposed on the other side of such second lever 27 so as to likewise engage the cross-head thereon and rock the shaft, the arrangement being such that said shaft may be thus rocked by either lever without interfering with the other.

The controller 30 for the electric motor is shown in outline only (see Figs. 1 and 2) and may be of any well known construction whereby the current from the batteries (not shown) may be supplied to the motor 31 in varying amount so as to increase or decrease the power applied to the driving mechanism. Only the operating lever 32 of such controller is shown, the arrangement and construction of this lever being such that when moved in one direction the current supplied to the motor is thus varied, whereas when it is moved in the other direction it serves to tighten a brake-band 33 upon a brake-wheel 34 carried by the motor spindle, such connection being secured by a system of bell-cranks 35 and connecting rods 36, as shown in Fig. 1. Actuation of the lever 32 on the controller may be effected either by the handled controller lever 37 mounted adjacent to the rear fixed seat 3 of the vehicle or by a similar lever 38 mounted on the front or swivel seat 4, but it will be necessary to describe with greater detail the construction of such swivel seat before the connections can be set forth.

The details of the swivel mounting of such forward seat are fully shown in Figs. 8, 9 and 10 and do not require special description. It will be noted, however, that the swivel-base 40 of the seat proper is normally retained in one or the other of two selected angular positions about its axis of oscillation by means of a reciprocable plunger 41 that is adapted to engage either of two apertures 42 or 43 in the upper face of the supporting pedestal (Fig. 10), such face being formed so as to maintain the plunger in its raised position (shown in Fig. 9ª) except in these particular angular positions of the seat. In the one such position, viz., that illustrated in Figs. 1, 2 and 9, the seat faces forwardly and is designed to be occupied by the driver of the vehicle; while in the other position, the seat faces in a substantially reverse direction and if occupied at all will be occupied by a passenger. When occupied by a driver, the occupant will most conveniently leave the seat to descend from the vehicle by swinging around in the same in the direction of the arrow in Fig. 1 until he faces substantially to the rear, thereby increasing the space between the rear seat and such forward seat. When swung in this direction the plunger is simply raised out of the aperture 42 and rides on the face of the pedestal until it engages a stop 44 limiting the rotation of the seat in the direction in question. To dispose the seat for non-use, or for use by a passenger, such plunger is thus raised and the seat swung in the opposite direction from that indicated by the arrow in Fig. 1, until the plunger engages the second aperture 43, thereby locking the seat in this position.

The plunger 41 is adapted to be raised by means of a rocker 45 on the outer end of which is a lever 46, while a spring 47 is arranged to normally press the plunger downwardly so that it will enter whichever of the apertures or sockets 42 or 43 in the pedestal it may be brought over. The rocker, which is thus operatively connected with the plunger, is also provided with a forwardly extending arm 48 that coöperates with the controller lever carried by the seat, as will presently be described, it being observed that when the seat is locked in position for driving, as shown in Figs. 1, 8 and 9, this extension 48 of the rocker is raised so as not to interfere with the operation of the controller lever 38.

The latter is a modified form of the combined controller and circuit closer which forms the subject matter of United States Letters Patent No. 911,030, granted to me February 2, 1909. Thus the controller handle proper, which has been previously referred to as carrying one of the buttons 7 used to close the alarm bell, forms the upper end of a hollow lever in which are incased the various operative parts, the whole being mounted on a rock-shaft 50 that is carried in suitable bearings in the seat base 40, such bearings being alined in a general radial direction with relation to the pivotal axis of the seat. At its inner end, this shaft 50 is provided with a lever 51, the free end of which is substantially centrally disposed with respect to the axis of the seat, and is there pivoted to a connecting rod 52 that extends downwardly through the seat to a point below the floor level of the car, or vehicle. A yoke 53 (Figs. 3, 5 and 6), swiveled onto the lower end of this rod, serves to connect the same to one arm 54 of a lever that is oscillatory about a shaft 55, supported in a casing 56 fixed to the underside of the vehicle frame directly below the pedestal.

At the inner end of the rock-shaft 50, and conveniently fashioned integrally with the lever arm 51, is a forwardly and downwardly extending arm 57 that has a lateral projection of segmental form, which, in the normal position of the extension 48 of the rocker 45 for operating the plunger 41, swings clear of such extension, as shown in Fig. 9. When, however, said plunger is raised as shown in Fig. 9ª, the forward end of this projection will engage the extension in question and thereby prevent movement of the handle of controller lever 38 forwardly of its neutral position, that is, in a direction to the left from that in which it is shown in said Figs. 9 and 9ª, although said lever is left free to be swung backward, that is in the opposite direction from such normal position. It will also be observed that when this handled lever is swung forwardly, or to the left from the position shown in said Figs. 9 and 9ª, the segmental projection 57 will be moved below the extension 48 of the plunger-operating rocker 45, so as to prevent said extension from being depressed, or, in other words, the plunger 41 from being raised. This is the situation whenever the handled lever 38 of the controller is moved forwardly from its neutral position and effectually prevents the plunger from being raised so as to permit the seat to be swung about its axis, if said lever has been moved to actuate the controller proper; in other words, it is impossible to unlock the swiveled seat for the purpose of rotating the same while the lever is in use to actuate the controller.

Not only does the handled lever thus serve to operate the hand-brake and the controller through the connections just described, but it also carries the terminals 60 (Fig. 2) for the motor circuit and means for closing or opening said terminals as desired, the latter comprising a brush 61 secured to the lower end of a plunger 62 vertically reciprocable within the lever and adapted to bridge said terminals when the plunger is raised. To thus lift the plunger and close the circuit by bringing this brush into contact with the terminals 60, a hand-piece 63 is secured to the upper end of the plunger, said hand-piece being adapted to hold the plunger in its raised position when desired. The detailed construction of the plunger and hand-piece, as well as that of the locking means which are provided for securing said plunger in its lower position in which the circuit is left open, form no part of the present invention and need not be further described than to note that a removable key 64 is used to thus lock said plunger in open position.

The handled lever 37 mounted adjacent to the rear fixed seat 3 of the vehicle is similar in all respects to the lever 38 mounted on the forward seat, including a plunger 65 with hand-piece 66, whereby the motor circuit may be independently opened or closed by raising a brush 67 to bridge two contacts 68, 68. This lever 37 is oscillatory about a shaft 69 forming its axis, which shaft carries a lever arm 70 that is connected by means of two rods 71 and an intermediate bell crank 72 with one arm of a lever 73 oscillatory about the same shaft 55 upon which the lever 54 is mounted.

These two levers 54 and 73 have similar downwardly extending arms 74 and 75, respectively (Figs. 4, 5, 6 and 7), which arms are adapted to be interlocked with a forked arm 76 on yet another lever 77 mounted on the same shaft between said two levers, so as not only to be oscillatory about said shaft but also reciprocable longitudinally of the same to effect such interlocking engagement with either one or the other of said two levers, as desired. Said third lever 77 is directly operatively connected with the lever 32 of the controller, proper, by means of a rod 78 (Figs. 1 and 2), shifting of said lever 77 being effected by means of a shifter arm 79 pivotal about a vertical axis 80 and engaging a segmental groove 81 on the body of the lever, whereby said arm may shift the lever without interfering with its capacity to rock about the shaft.

Said shifter arm 79 is in turn actuated by means of a transversely slidable cam-plate 82, shown in plan view in Figs. 4 and 6, such cam-plate having two internal cam faces 83 and 84 formed in an opening that is alined with the opening in the pedestal 5 so as to permit the connecting rod 52 to pass therethrough without interference, as also the wires (not shown) that lead from the contacts 60, 60 and push-button 7 of handled lever 38 to the appropriate parts of the motive and alarm mechanisms, respectively. This cam-plate 82 is constrained to move in a transverse direction by two screws or bolts 85 passing through transverse slots in the same, movement of the plate being effected in one direction or the other by rotation of the seat base 40, the downwardly extending tubular portion 86 of which carries a lug 87 arranged to contact with the face 84, when the seat is turned in the direction indicated by the arrow in Fig. 1, and to engage with the other face 83, when said seat is rotated in the opposite direction. This lug is provided with an anti-friction roller 88 on the end which engages with the last-mentioned face and is curved to interlock with a circular portion 89 of the opening in the plate after it has engaged the cam-face 84 and moved past the same.

The arrangement of the cam faces 83 and 84 in the plate 82 is such that when the swivel seat 4 faces inwardly, or is in the position in which it will either be unoccupied or occupied only by a passenger, said plate 82 is shifted so as to occupy the position shown in Figs. 4 and 5, in which the shifter arm 79 is actuated to operatively connect the lever 77 with the lever 73. The handled lever 37 beside the rear seat is accordingly operatively connected with said lever 77 and is so enabled, through the connecting rod 78 extending from said lever to the lever on the controller 30 to operate the latter. When, on the contrary, the front seat is turned to face forwardly to be occupied by the driver, the plate 82 is moved in the opposite direction from that just described and, as shown in Figs 6 and 7, actuates the shifter arm 79 to disconnect lever 77 from lever 73 and interlock it instead with lever 53, so that the handled lever 38 on such front seat is now adapted to operate the controller through the connecting rod 78, the turning of the seat into this position serving at the same time to render effective the connections between the connecting rod 52 and the rock-shaft 50 in the seat, on which the handled lever is mounted.

It will thus be seen that the handled controller-operating lever beside the rear seat can only be used when the front seat is faced inwardly, and, conversely, that the handled lever on the front side can only be used when said front seat is faced forwardly, in which event such first-mentioned lever is inoperative. The lever on the forward seat is secondarily controlled by the swinging of the seat in the opposite direction from that in which it would be swung thus to face it about, through the medium of the segmental projection 57 and the extension 48 on the plunger-operating rocker 45, so as to prevent actuation of said lever forwardly from its normal or neutral position if the driver turns the seat in the direction last mentioned, on leaving the car (such direction being indicated by the arrow in Fig. 1).

The same shiftable cam-plate 82, which controls the connection of the handled levers 37 and 38 with the controller proper, also controls the wheel-brake actuating mechanism and specifically the rear foot-lever 18, that is mounted adjacent to the pedestal 5 on which the front seat swivels. To this end, such plate is laterally extended so as to bring an off-set 107 on its rear edge in front of said lever, when the plate occupies the position shown in Fig. 6, such engagement preventing the lever from being moved forwardly. Thus the rear brake pedal is locked, at the same time that the handled controller-operating lever 37 beside the rear seat is rendered inoperative, viz., whenever the front seat is swung around into its inwardly facing position. The locking of the rear brake lever does not interfere with the operation of the brakes by means of the forward lever, owing to the character of the lost motion connection between said levers and the rock-shaft 13, with which the brake mechanism proper is operatively connected.

The position of the shiftable cam-plate 82, furthermore controls the motor-reversing mechanism, such latter mechanism comprising two depressible pedals 90 and 91, respectively located directly in front of the rear and forward seats, so as to be easily operated by the left heel of the driver when occupying either of said seats. As shown in Figs. 1, 2 and 11, these pedals are respectively connected by means of bell-cranks 92 and 93 and connecting rods 94 and 95 with two rockers 96 and 97 that are oscillatory about a shaft 98 supported from the same casing 56 in which shaft 55 is supported. Each of these rockers is adapted, independently of the other, to engage a third rocker 99 (Figs. 12 and 13), which is connected by means of a rod 100 with the reversing switch 101 on the controller 30. A spring 102 normally retains the latter against such actuation, while other springs 103 and 104, respectively connected with the rods 94 and 95, retain the same with their operating pedals normally in inoperative position. The shiftable cam-plate 82, in addition to having its rear edge formed to engage and lock the brake lever 18, is formed with two engaging faces 105 and 106, that are respectively adapted to intersect the plane of movement of the rockers 96 and 97, the rocker 97 connected with the forward pedal 91 being thus held against oscillation, when the plate is shifted into the position shown in Fig. 4, in which the rear handled lever 37 and rear brake lever 18 are rendered operative, and the rocker 98 connected with the rear pedal 92 being held against oscillation in the position of the plate illustrated in Fig. 6, which corresponds with the operative condition of the handled lever 38 on the front seat and that of the forward brake lever 17.

The general mode of operation of my improved controlling mechanism should be readily evident from the foregoing description of the construction of the several component parts of the mechanism and the mode of operation of such parts respectively.

The position of such parts, as shown in Figs. 1 and 2, corresponds with that in which the front seat 4 faces forwardly, or, in other words, is designed to be occupied by the driver of the vehicle. In this position not only is the rear controller-actuating lever 37 beside the rear seat rendered inoperative by having the shiftable lever 77 disconnected from lever 73, but the adjacent foot lever 18 for actuating the braking mechanism of the vehicle is locked against actuation by the plate 82, and at the same time the corresponding depressible pedal 90 for actuating the motor-reversing mechanism is held against operation by said plate 82. The occupant of the rear seat can accordingly do nothing to affect the operation of the car through any of the three controlling devices just described. The occupant of the front seat 4, on the contrary, will find not only the front foot lever 17 free to operate the brake mechanism, but also the corresponding depressible pedal 91 for reversing the motor and the handled lever 38 for otherwise controlling the motor. The occupant of such seat may accordingly drive the car with all three of these devices available for its control, in addition to the steering lever or wheel (not shown).

Assuming it is desired to merely stop the car with the parts arranged as described, the controller lever 38 is moved to the proper position to stop the motor and if necessary the brakes are applied by actuating the foot lever 17. If the driver desires to descend from the car, the front seat will be unlocked by raising pin 41 through the agency of lever 46, and the seat turned in the direction indicated by the arrow in Fig. 1, until the seat faces rearwardly and outwardly so as to allow ready egress through the adjacent door. Movement of the seat in this direction is limited by the stop 44 engaging the plunger 41, as previously described. When the seat is swung in this direction, while the connection between shiftable levers 77 and the lever 54, which is connected with said handled lever 38, remains unbroken, the last-named lever is locked against movement in any but rearward direction by the interposition of the extension 48 in the path of arm 57, as shown in Fig. 9ᵃ. In other words, the handled lever 38 may be still used to actuate the motor brake, but cannot be moved forwardly so as to connect the motor in circuit with the battery. The situation as to the front foot lever 17 and pedal 91 remaining free, while the corresponding lever and pedal adjacent to the rear seat are locked, remains unchanged because swinging of the seat in the direction just described does not shift the plate 82 from the position shown in Fig. 6, the lug 87 merely moving in counter clockwise direction in contact with the circular portion 89 of the opening in said plate, as shown in said Fig. 6.

Assuming the seat to be in the position for driving as before, that is, as shown in Figs. 1 and 2, and the car to be stopped, with the brake applied through the front foot lever 17, such front seat may be turned in the direction opposite to that indicated by the arrow in Fig. 1 by raising the plunger 41 through lever 46, as before, and then manually swinging such seat. The raising of this plunger at once automatically locks the handled lever 38 against any use other than that of applying the motor brake, should this be found desirable, in order to supplement the action of the wheel brake applied through the foot lever 17. The swinging of the seat in the direction just described, moreover, serves to move the lug 87 in a clockwise direction, as shown in Fig. 6, thus bringing the roller 88 thereon into engagement with the cam face 83 on the plate 82, and shifting the same into its other position, as shown in Fig. 4, wherein shiftable lever 77 is interlocked with lever 73, and at the same time the rear foot lever 18 is left free as well as the rear depressible pedal 90, the front pedal 91 being simultaneously locked. The driver may now occupy the rear seat and control the car from said seat, first releasing the front foot lever 17 in case the same was left "on."

It will be noted that in the construction as illustrated, and just described as to its general mode of operation, this front foot lever 17 for actuating the wheel brakes of the car is no time locked against use. This is not deemed necessary in such illustrated construction for the reason that where the forward seat is turned into the position just described, it covers such foot lever and so guards the same against accidental or improper use. This arrangement also permits the wheel brakes to be locked while the driver is shifting from the front seat to the rear seat, as has just been explained.

From the foregoing description of the construction and mode of operation of the several mechanisms entering into the general controlling mechanism, it will be seen that a number of highly advantageous results are secured, rendering it entirely feasible to install in a vehicle, such as an electric automobile, a "double drive," without endangering the safety of the occupants by reason of attempted conjoint operation of two sets of controlling devices (levers, pedals or the like). In other words, in selecting one set or the other of such devices for use, the other set is automatically rendered inoperative, and such devices are so interconnected that it is impossible for the driver, through carelessness or ignorance, to fail to properly secure the one set of devices before proceeding to use the other. It is well understood that the control of any vehicle, for obvious reasons of safety, should rest undisturbed in the driver, since a hasty or even unintentional movement on the part of a passenger might result in disaster. The provisions for safety made in the hereinbefore described construction of controlling mechanism, accordingly, have proven entirely satisfactory under all conditions of use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a motor vehicle, the combination with a plurality of seats, one of said seats being relatively fixed and the other movable; of similar controlling devices for said vehicle disposed adjacent to said seats, respectively, said movable seat in one position rendering inoperative the device adjacent thereto and rendering operative the device adjacent to said fixed seat, said movable seat reversely affecting said devices in another position the action of said seat being positive in both cases.

2. In a motor vehicle, the combination with a plurality of seats, one of said seats being relatively fixed and the other movable; of sets of controlling devices for said vehicle disposed adjacent to said seats, respectively, said movable seat being interconnected with said devices, whereby its position positively affects the operative action thereof.

3. In a motor vehicle, the combination with a plurality of seats, one of said seats being relatively fixed and the other movable; of sets of controlling devices for said vehicle disposed adjacent to said seats, respectively, said movable seat in one position rendering inoperative the set of devices adjacent thereto and rendering operative the set of devices adjacent to said fixed seat, said movable seat reversely affecting said sets of devices in another position the action of said seat being positive in both cases.

4. In a motor vehicle, the combination with a fixed seat and a swiveled seat; of similar controlling devices for said vehicle disposed adjacent to said seats, respectively, said swiveled seat being interconnected with said devices, whereby its position positively affects the operative action thereof.

5. In a motor vehicle, the combination with a fixed seat and a swiveled seat; of similar controlling devices for said vehicle, disposed adjacent to said seats, respectively, said swiveled seat in one angular position rendering inoperative the device adjacent thereto and rendering operative the device adjacent said fixed seat, said swiveled seat reversely affecting said devices in another position the action of said seat being positive in both cases.

6. In a motor vehicle, the combination with a fixed seat and a swiveled seat; of a set of controlling devices disposed adjacent to each of said seats, said swiveled seat being interconnected with said devices, whereby its position positively affects the operative action thereof.

7. In a motor vehicle, the combination with a fixed seat and a swiveled seat; of a set of controlling devices disposed adjacent to each of said seats, said swiveled seat in one angular position about its axis rendering inoperative the set of devices adjacent thereto and rendering operative the set of devices adjacent to said fixed seat, said swiveled seat reversely affecting said sets of devices in another position the action of said seat being positive in both cases.

8. In a motor vehicle, the combination of a controlling mechanism; a plurality of seats, one of said seats being relatively fixed and the other movable; levers adjacent to said seats, respectively; and means adapted to operatively connect either of said levers with said mechanism, said means being controlled by the position of said movable seat.

9. In a motor vehicle, the combination of a controlling mechanism; a fixed seat and a swiveled seat; a lever adjacent each of said seats; and means adapted to operatively connect either of said levers with said mechanism, said means being controlled by the angular position of said swiveled seat about its axis.

10. In a motor vehicle, the combination of a fixed rear seat; a swiveled front seat adapted either to face forwardly or inwardly as desired; and similar controlling devices disposed adjacent to said seats, respectively, said swiveled seat being interconnected with said devices, whereby its position positively affects the operative action thereof.

11. In a motor vehicle, the combination of a fixed rear seat; a swiveled front seat adapted either to face forwardly or inwardly as desired; and a set of controlling devices disposed adjacent to each of said seats, said swiveled seat being adapted when facing forwardly to render operative the set of devices adjacent thereto and to render inoperative the set of devices adjacent to said rear seat, said swiveled seat reversely affecting said sets of devices when facing inwardly the action of said seat being positive in both cases.

12. In a motor vehicle, the combination of a controlling mechanism; a fixed rear seat; a swiveled front seat adapted either to face forwardly or inwardly as desired; a lever adjacent to each of said seats; and means adapted to operatively connect either of said levers with said mechanism, said means being controlled by the position of said swiveled seat.

13. In a motor vehicle, the combination of a controlling mechanism; a fixed rear seat; a swiveled front seat adapted either to face forwardly or inwardly as desired; a lever adjacent to said rear seat; a second lever carried by said swiveled seat; and means adapted to operatively connect either of said levers with said mechanism, said means being controlled by the position of said swiveled seat.

14. In a motor vehicle, the combination of a controlling mechanism; a fixed rear seat; a swiveled front seat adapted either to face forwardly or inwardly as desired; a lever adjacent to said rear seat; a second lever carried by said swiveled seat; and means adapted to operatively connect either of said levers with said mechanism, actuation of the lever carried by said swiveled seat being also controlled by the position of said seat.

15. In a motor vehicle, the combination of a controlling mechanism; a fixed rear seat; a swiveled front seat adapted either to face forwardly or inwardly as desired; a lever adjacent to said rear seat; a second lever carried by said swiveled seat; and means adapted to operatively connect either of said levers with said mechanism, the movement of said swiveled seat being dependent upon the position of the lever carried thereby.

16. In a motor vehicle, the combination of a controlling mechanism; a fixed rear seat; a swiveled front seat adapted either to face forwardly or inwardly as desired; a lever adjacent to said rear seat; a second lever carried by said swiveled seat; and means adapted to operatively connect either of said levers with said mechanism, said means being controlled by the position of said swiveled seat, the parts being so arranged and constructed that the lever carried by said swiveled seat can be actuated only in certain position of said seat and the latter can be moved only in certain position of said lever.

17. In a motor vehicle, the combination of a controlling mechanism; a plurality of seats, one of said seats being relatively fixed and the other movable; devices for operating said mechanism adjacent to said seats, respectively; movable members connected with said devices, respectively; and another member connected with said mechanism and shiftable into engagement with either of said first-named members, said last-named member being thus shiftable by said movable seat.

18. In a motor vehicle, the combination of a controlling mechanism; a plurality of seats, one of said seats being relatively fixed and the other movable; devices for operating said mechanism adjacent to said seats, respectively; levers connected to be oscillated by said devices, respectively; and another lever operatively connected with said mechanism and shiftable into engagement with either of said first-named levers, said last-named lever being thus shiftable by said movable seat.

19. In a motor vehicle, the combination of a controlling mechanism; a fixed seat; a swiveled seat; devices for operating said mechanism adjacent to said seats, respectively; two levers oscillatory about the same axis and operatively connected with said devices, respectively; a third lever operatively connected with said mechanism, said third lever being oscillatory about the same axis as said first-named levers and shiftable into interlocking engagement with either of the same; and a movable arm for thus shifting said third lever, said shifter-arm being operatively connected with said swiveled seat.

20. In a motor vehicle, the combination of a controlling mechanism; a fixed seat; a swiveled seat; devices for operating said mechanism adjacent to said seats, respectively; two levers oscillatory about the same axis and operatively connected with said devices, respectively; a third lever operatively connected with said mechanism, said third lever being oscillatory about the same axis as said first-named levers and shiftable into interlocking engagement with either of the same; a swinging arm for thus shifting said third lever; and a cam-plate, operable by said swiveled seat, and connected with said arm.

21. In an electric motor vehicle, the combination of a controller for the motor; braking mechanism; a fixed seat; a movable seat; a device for actuating said controller and another for actuating said mechanism disposed adjacent to each of said seats; movable members respectively connected with the devices for actuating said controller; another member operatively connected with said controller and shiftable into engagement with either of said first-named members, said last-named member being thus shiftable by said movable seat and the latter being adapted simultaneously to render operative or inoperative one of the brake-actuating devices.

22. In an electric motor vehicle, the combination of a controller for the motor; braking mechanism; a fixed seat; a movable seat; a device for actuating said controller and another for actuating said mechanism disposed adjacent to each of said seats; levers respectively connected to be oscillated by the devices for actuating said controller; another lever operatively connected with said controller and shiftable into engagement with either of said first-named levers, said last-named lever being thus shiftable by said movable seat and the latter being adapted simultaneously to render operative or inoperative one of the brake-actuating devices.

23. In an electric motor vehicle, the combination of a controller for the motor; braking mechanism; a fixed seat; a movable seat; a device for actuating said controller and another for actuating said mechanism disposed adjacent to each of said seats; two levers oscillatory about the same axis and respectively connected to the devices for actuating said controller; a third lever operatively connected with said mechanism, said third lever being oscillatory about the same axis as said first-named levers and shiftable into interlocking engagement with either of the same; and a movable arm for thus shifting said third lever, said movable seat being adapted to operate said shifter arm and simultaneously to render operative or inoperative one of the brake-actuating devices.

24. In an electric motor vehicle, the combination of a controller for the motor; braking mechanism; a fixed seat; a movable seat; a device for actuating said controller and another for actuating said mechanism disposed adjacent to each of said seats; two levers oscillatory about the same axis and respectively connected to the devices for actuating said controller; a third lever operatively connected with said mechanism, said third lever being oscillatory about the same axis as said first-named levers and shiftable into interlocking engagement with either of the same; a swinging arm for thus shifting said third lever; and a cam-plate, operable by said movable seat and connected with said arm, said plate being adapted in one position to render inoperative one of the brake-actuating devices.

25. In an electric motor vehicle, the combination of a controller for the motor; braking mechanism; a fixed rear seat; a swiveled front seat adapted to face either forwardly or inwardly as desired; a device for actuating said controller and another for actuating said mechanism disposed adjacent to each of said seats; movable members respectively connected with the device for actuating said controller; and another member operatively connected with said controller and shiftable into engagement with either of said first-named members, said last-named member being thus shiftable into engagement with the one of said first-named members adjacent said rear seat upon turning said swiveled seat into inwardly facing position, and with the other of said first-named members upon turning said swiveled seat into forwardly facing position, said swiveled seat being adapted, in such forwardly facing position, to render the device for actuating the braking mechanism located adjacent said rear seat inoperative.

26. In an electric motor vehicle, the combination of a controller for the motor; braking mechanism; a fixed rear seat; a swiveled front seat adapted to face either forwardly or inwardly as desired; a device for actuating said controller and another for actuating said mechanism disposed adjacent to each of said seats; levers respectively connected to be oscillated by the devices for actuating said controller; and another lever operatively connected with said controller and shiftable into engagement with the one of said first-named levers adjacent said rear seat upon turning said swiveled seat into inwardly facing position, and with the other of said first-named levers upon turning said swiveled seat into forwardly facing position, said swiveled seat being adapted, in such forwardly facing position, to render inoperative the device for actuating the braking mechanism adjacent said rear seat.

27. In an electric motor vehicle, the combination of a controller for the motor; braking mechanism; a fixed rear seat; a swiveled front seat adapted to face either forwardly or inwardly as desired; a device for actuating said controller and another for actuating said mechanism disposed adjacent to each of said seats; two levers oscillatory about the same axis and respectively connected to the devices for actuating said controller; a third lever operatively connected with said mechanism, said third lever being oscillatory about the same axis as said first-named levers and shiftable into interlocking engagement with either of said first-named levers; and a movable arm adapted to shift said third lever, said movable seat being adapted to actuate said arm to shift said third lever into engagement with the one of said first-named levers adjacent said rear seat upon turning said swiveled seat into inwardly facing position, and with the other of said first-named levers upon turning said swiveled seat into forwardly facing position, said swiveled seat being adapted, in such forwardly facing position, to render inoperative the device for actuating the braking mechanism adjacent said rear seat.

28. In an electric motor vehicle, the combination of a controller for the motor; a braking mechanism; a fixed rear seat; a swiveled front seat adapted to face either forwardly or inwardly as desired; a device for actuating said controller and another for actuating said mechanism disposed adjacent to each of said seats; two levers oscillatory about the same axis and respectively connected to the devices for actuating said controller; a third lever operatively connected with said mechanism, said third lever being oscillatory about the same axis as said first-named levers and shiftable into interlocking engagement with either of the same; a swinging arm for thus shifting said third lever; and a cam-plate, operable by said swiveled seat and connected with said arm, said plate being adapted to engage said third lever with the one of said first-named levers adjacent to said rear seat upon turning said swiveled seat into inwardly facing position and with the other of said first-named levers upon turning said swiveled seat into forwardly facing position, said plate being adapted, in such forwardly facing position of said swiveled seat, to render inoperative the device for actuating the braking mechanism adjacent said rear seat.

29. In a motor-vehicle, the combination of a fixed seat; a movable seat; a braking mechanism; a device for actuating said mechanism disposed adjacent to each of said seats; and positively-acting means adapted to render one of said brake-actuating devices operative or inoperative, as desired.

30. In a motor-vehicle, the combination of a fixed seat; a movable seat; a braking mechanism; a device for actuating said mechanism disposed adjacent to each of said seats; and positively-acting means adapted to render one of said brake-actuating devices operative or inoperative, as desired, said means being controlled by the position of said movable seat.

31. In a motor-vehicle, the combination of a fixed seat; a movable seat; a braking mechanism; a device for actuating said mechanism disposed adjacent to each of said seats; and means adapted to render the brake-actuating device adjacent said fixed seat operative or inoperative, as desired.

32. In a motor-vehicle, the combination of a fixed seat; a movable seat; a braking mechanism; a device for actuating said mechanism disposed adjacent to each of said seats; and means adapted to render the brake-actuating device adjacent said fixed seat operative or inoperative, as desired, said means being controlled by the position of said movable seat.

33. In a motor-vehicle, the combination of a fixed seat; a swiveled front seat adapted to face either forwardly or inwardly as desired; a braking mechanism; a device for actuating said mechanism disposed adjacent to each of said seats; and means adapted automatically to render the brake-actuating device adjacent said rear seat inoperative when said front seat is faced forwardly.

34. In a motor-vehicle, the combination of a controller for the motor; a brake mechanism; a plurality of devices for actuating said controller and of corresponding devices for actuating said mechanism; and means adapted to render one of said controller-actuating devices operative and the other inoperative, and vice versa, said means simultaneously controlling the operability of said brake-mechanism-actuating devices.

35. In a motor-vehicle, the combination of a controller for the motor; a brake mechanism; a plurality of devices for actuating said controller and of corresponding devices for actuating said mechanism; and means adapted to render one of said controller-actuating devices operative and the other inoperative, and vice versa, said means being adapted to render one of said brake-mechanism-actuating devices operative or inoperative at the same time that the corresponding controller-actuating device is rendered operative or inoperative.

36. In a motor vehicle, the combination of a fixed seat; a movable seat; a controller for the motor; a brake mechanism; and a device for actuating said controller and a corresponding device for actuating said brake mechanism disposed adjacent each of said seats, said movable seat controlling the operability of both said devices.

37. In a motor vehicle, the combination of a fixed seat; a movable seat; a controller for the motor; a brake mechanism; and a device for actuating said controller and a corresponding device for actuating said brake mechanism disposed adjacent each of said seats, said movable seat being adapted to render one of said controller-actuating devices operative and the other inoperative, and vice versa, said movable seat simultaneously controlling the operability of said brake-mechanism-actuating devices.

38. In a motor-vehicle, the combination of a fixed seat; a movable seat; a controller for the motor; a brake mechanism; and a device for actuating said controller and a corresponding device for actuating said brake mechanism disposed adjacent each of said seats, said movable seat being adapted to render one of said controller-actuating devices operative and the other inoperative, and vice versa, said movable seat being adapted to render one of said brake-mechanism-actuating devices operative or inoperative at the same time that the corresponding controller-actuating device is rendered operative or inoperative.

39. A vehicle having two stands for the driver, from either of which control of said vehicle may be effected, one of said stands being movable into and out of position for occupancy by such driver; braking mechanism for checking the travel of the vehicle; a lever individual to each stand for operating said braking mechanism; and a stop operable by said movable stand adapted to render the lever individual to the other stand inoperative.

40. A vehicle having two stands for the driver, from either of which control of said vehicle may be effected, one of said stands being movable into and out of position for occupancy by such driver; braking mechanism for checking the travel of the vehicle, a foot-pedal individual to each stand for operating said braking mechanism; and a stop operable by said movable stand adapted to render the foot-pedal individual to the other stand inoperative.

41. A vehicle having forward and rear seats from either of which control thereof may be effected, the forward seat being adapted to be turned to face forwardly or rearwardly; braking mechanism for checking the travel of the vehicle; mechanism individual to each seat for operating said braking mechanism, the mechanism at the rear seat including a brake actuating lever; a stop that may be placed in the path of said lever to prevent it from applying the brake; and means operated by the forward seat when turned to a forward facing position for placing said stop in the working path of said lever.

42. In a vehicle, the combination with mechanism to be controlled, of a plurality of duplicate and alternatively operable control devices, including lever members, and interlocking mechanism between said members, preventing simultaneous operation of different devices.

43. In a motor vehicle, the combination with mechanism to be controlled, of a plurality of duplicate groups of control devices located in different positions, and means for rendering said duplicate groups alternatively operable, automatically preventing simultaneous operation of the devices in different groups.

44. In a motor vehicle, the combination with mechanism to be controlled, of a plurality of duplicate and alternatively operable groups of control devices, including hand and pedal actuated members, and interlocking mechanism between said hand and pedal actuated control devices, preventing the simultaneous operation thereof in different groups.

45. In a vehicle, the combination of duplicate levers; braking mechanism independently operable from said levers; and positively-acting means adapted to render one of said levers operative or inoperative, as desired.

46. In a vehicle, the combination of duplicate levers; braking mechanism, connections from said levers to said mechanism whereby the latter may be operated by either of said levers independently of the other; and means adapted to lock said connections with respect to one of said levers, as desired.

47. In a vehicle, the combination of duplicate foot pedals; braking mechanism independently operable from said foot pedals;

and positively-acting means adapted to render one of said foot-pedals operative or inoperative, as desired.

48. In a vehicle, the combination of duplicate foot pedals; braking mechanism, connections from said foot-pedals to said mechanism whereby the latter may be operated by either of said foot-pedals independently of the other; and means adapted to lock said connections with respect to one of said foot-pedals, as desired.

Signed by me, this 6th day of April, 1914.

DE WITT C. COOKINGHAM.

Attested by—
    D. T. DAVIES,
    A. L. GILL.